(12) United States Patent
Carter et al.

(10) Patent No.: US 6,266,418 B1
(45) Date of Patent: Jul. 24, 2001

(54) ENCRYPTION AND AUTHENTICATION METHODS AND APPARATUS FOR SECURING TELEPHONE COMMUNICATIONS

(75) Inventors: Matthew Carter, Mt. Laurel; Frank Costantini, Swedesboro; Moishe Kleidermacher, Marlton; Ellwood McGrogan, Cherry Hill; Ronald Paraggio, Erial, all of NJ (US)

(73) Assignee: L3-Communications Corporation, New York, NY (US)

( * ) Notice: Subject to any disclaimer, the term of this patent is extended or adjusted under 35 U.S.C. 154(b) by 0 days.

(21) Appl. No.: 09/428,844

(22) Filed: Oct. 28, 1999

Related U.S. Application Data

(60) Provisional application No. 60/122,682, filed on Mar. 3, 1999, and provisional application No. 60/106,016, filed on Oct. 28, 1998.

(51) Int. Cl.[7] .................................................. H04L 9/10
(52) U.S. Cl. .................... 380/257; 380/269; 380/275; 379/442
(58) Field of Search ................................... 380/256, 257, 380/41, 269, 275; 379/201, 442

(56) References Cited

U.S. PATENT DOCUMENTS

| | | | |
|---|---|---|---|
| 2,898,402 | 8/1959 | Cory et al. | 178/22 |
| 2,951,120 | 8/1960 | Dingley, Jr. | 178/22 |
| 3,781,472 | 12/1973 | Goode et al. | 178/22 |
| 4,167,700 | 9/1979 | Coe et al. | 352/32 |
| 4,211,891 | 7/1980 | Glitz | 375/2 |
| 4,281,216 | 7/1981 | Hogg et al. | 178/22.08 |
| 4,368,357 | 1/1983 | Gurak | 179/1.5 R |
| 4,549,308 | 10/1985 | LoPinto | 455/26 |
| 4,612,414 | 9/1986 | Juang | 179/1.5 R |
| 4,691,355 | 9/1987 | Wirstrom et al. | 380/23 |
| 4,694,492 | 9/1987 | Wirstrom et al. | 380/23 |

(List continued on next page.)

OTHER PUBLICATIONS

Addison, K.P., et al., "Secure Networking at Sun Microsystems, Inc.," National Computer Security Conference, Oct. 17–20, 1988, 212–218.

Branstad, D., et al., "SP4: A Transport Encapsulation Security Protocol," *A Collection of Technical Papers: AIAA/ASIS/IEEE Third Aerospace Computer Security Conference: Applying Technology to Systems*, Orlando, Florida, Dec. 7–11, 1987, 143–147.

Cain, R., et al., "12000 BPS Telephone Modem for Digital Voice Security," *1985 Carnahan Conference on Security Technology*, May 15–17, 1985, 25–28.

(List continued on next page.)

*Primary Examiner*—Gilberto Barron, Jr.
*Assistant Examiner*—Anthony Di Lorenzo
(74) *Attorney, Agent, or Firm*—Woodcock Washburn Kurtz Mackiewicz & Norris LLP

(57) ABSTRACT

An encryption device for a telephone having a handset and a base unit is disclosed. The device includes a handset interface, a first converter, an encryption processor, a second converter, and a host interface. The handset interface receives analog output signals from the handset. The first converter converts the analog output signals into digital output signals. The encryption processor includes a compressor, a key manager, an encryptor, and a modulator. The key manager generates key material for encrypting the digital output signals. The compressor compresses the digital output signals, the encryptor encrypts the digital output signals based on the key material, and the modulator modulates the encrypted digital output signals. The second converter converts the encrypted digital output signals into encrypted analog output signals. The host interface receives the encrypted analog output signals from the encryption processor, and forwards the encrypted analog output signals to the base unit.

15 Claims, 4 Drawing Sheets

SCS Functional Block Diagram

U.S. PATENT DOCUMENTS

| | | | |
|---|---|---|---|
| 4,794,644 | 12/1988 | Philip et al. | 380/23 |
| 4,802,220 | 1/1989 | Marker, Jr. | 380/33 |
| 4,811,392 | 3/1989 | Marzolini | 380/9 |
| 4,817,146 | 3/1989 | Szczutkowski et al. | 380/48 |
| 4,823,380 | 4/1989 | Kohen et al. | 379/387 |
| 4,856,063 | 8/1989 | McCalmont | 380/48 |
| 4,866,707 | 9/1989 | Marshall et al. | 370/94.1 |
| 4,893,339 | 1/1990 | Bright et al. | 380/28 |
| 4,897,875 | 1/1990 | Pollard et al. | 380/21 |
| 4,920,567 | 4/1990 | Malek | 300/33 |
| 4,953,210 | 8/1990 | McGlynn et al. | 380/48 |
| 4,959,863 | 9/1990 | Azuma et al. | 380/38 |
| 4,965,804 | 10/1990 | Trbovich et al. | 380/21 |
| 5,007,084 | 4/1991 | Materna et al. | 380/24 |
| 5,099,515 | 3/1992 | Kobayashi et al. | 380/2 |
| 5,163,088 | 11/1992 | LoCascio | 379/95 |
| 5,166,977 | 11/1992 | Ross | 380/18 |
| 5,172,414 | 12/1992 | Reeds, III et al. | 380/45 |
| 5,177,785 | 1/1993 | Itani et al. | 380/6 |
| 5,222,136 | 6/1993 | Rasmussen et al. | 380/9 |
| 5,289,542 | 2/1994 | Kessler | 380/9 |
| 5,307,402 * | 4/1994 | Cooper | 379/93.3 |
| 5,351,300 | 9/1994 | Quisquater et al. | 380/46 |
| 5,353,351 | 10/1994 | Bartoli et al. | 380/33 |
| 5,410,741 * | 4/1995 | Cahill et al. | 455/69 |
| 5,452,289 * | 9/1995 | Sharma et al. | 370/286 |
| 5,455,861 * | 10/1995 | Faucher et al. | 380/266 |
| 5,473,696 | 12/1995 | van Breemen et al. | 380/49 |
| 5,495,527 * | 2/1996 | Rollhaus, Jr. et al. | 379/387 |
| 5,724,427 * | 3/1998 | Reeds, III et al. | 380/259 |
| 5,787,154 | 7/1998 | Hazra et al. | 379/93.03 |
| 5,809,147 | 9/1998 | De Lange et al. | 380/28 |
| 5,854,841 * | 12/1998 | Nakata et al. | 713/152 |

OTHER PUBLICATIONS

Cox, R.V., "The Analog Voice Privacy System," *AT&T Technical Journal*, 1987, 66(1), 119–131.

Cox, R.V., et al., "The Analog Voice Privacy System," *ICASSP 86 Proceedings*, Tokyo, Japan, IEEE, Apr. 7–11, 1986, vol. 1 of 4, 341–344.

Cramer, R., et al., "Design and Implementation of a Secure Terminal Gateway," *Fourth Aerospace Computer Security Applications Conference, IEEE*, 1988, 262–268.

Herbison, B.J., "Security on an Ethernet," *11th National Computer Security Conference*, Oct. 17–20, 1988, 219–225.

Jo, K.Y., et al., "Interconnection of Heterogeneous Defense Data Networks," *Conference Record, IEEE Military Communications Conference*, Oct. 15–18, 1989, 0810–0816.

Lindell, K., "Audio Scrambling System," *Radio–Electronics*, 1988, 51–77.

Linn, J., "Comsec Integration Alternatives," *11th National Computer Security Conference*, Oct. 17–20, 1988, 122–125.

Matsunaga, A., et al., "An Analog Speech Scrambling System Using the FFT Technique with High–Level Security," *IEEE Journal on Selected Areas in Communications*, 1989, 7(4), 540–546, 547.

Nelson, R., "End–to–End Encryption at the Network Layer," *5th Annual Computer Security Applications Conference*, IEEE Computer Society Press, Dec. 4–8, 1989, p. 28.

Schell, R.R., et al., "A Network of Trusted Systems," *A Collection of Technical Papers, AIAA/ASIS/IEEE Third Aerospace Computer Security Conference: Applying Technology to Systems*, Dec. 7–11, 1987, 140–142.

Schnackenberg, D.D., "Development of a Multilevel Secure Local Area Network," Reprinted from *Proceedings of the 8th National Computer Security Conference*, 1985, 403–410.

Steer, D.G., et al., "A Secure Audio Teleconference System," *Conference Record vol. 1 of 3, IEEE Military Communications Conference*, MILCOM88, Oct. 23–26, 1988, 0063–0067.

Sundareshan, M.K., et al., "Design and Deployment of an Integrated Data Ciphering Unit Inside a Low Bit Rate Voice Transcoder for Secure Voice Communications Over Telephone Networks," *BOSTONICC/89, World Prosperity Through Communications*, IEEE, Jun. 11–14, 1989, 1149–1153.

Tirenin, et al., "Enhanced Multinet Gateway: Survivable Multi–Level Secure Data Communications," *MILCOM91, Conference Record*, vol. 2 or 3, Military Communications in a Changing World, IEEE, 1991, 0740–0744.

Williamson, J. (ed.), Jane's Military Communications, 11th Edition, *Encryption & Security*, 1990–1991, 541–543.

Williamson, J. (ed.), Jane's Military Communications, 12th Edition, *Encryption & Security*, 1991–1992, 499–501, 506.

"Telephone and voice recording," *All Telephone and Voice Recordering Products* (p. 2 or 4), http://www.force–ten.com/forceten/tele_recorders2.htm, May 1, 2000, 1 page.

"Quick Tap telephone handset tap," http://www.jkaudio.com/products/product3.htm, May 1, 2000, 1 page.

"That–1 telephone handset audio tap," http://www.jkaudio.com/product11.htm, May 1, 2000, 2 pages.

"That–2 telephone handset audio tap," http://www.jkaudio.com/products/product12.htm, May 1, 2000, 2 pages.

"Telephone amplifiers, in–line amplifier (HA–25)," *GIF image 200x183 pixels*, wysiwyg://167/http://business.fortunecity.com/moo/256/page8.htm, May 1, 2000, 3 pages.

"Phone receiver amplifier and portable telephone amplifier," *Telephone Aides*, http://supply.medicaledge.com/page22.htm, May 1, 2000, 1 page.

"SecurePhone™," *Information Security Corporation*, http://www.infoseccorp.com/products/securephone.htm, May 2, 2000, 2 pages.

"The voice changer II," http://www.clever.net/security/voic.htm, May 2, 2000, 1 page.

"Talk link voice changer," *Spy Supply Online: Phone Security*, http://www.spysupplyonline.com/phonesec.html, May 1, 2000, 1 page.

"LX40™ series telephone scrambler," *LX40 Series*, http://www.transcrypt.com/Pages/Telephony/lx40.html, May 2, 2000, 2 pages.

"DME series landline encryptor," *DME Series*, http://www.transcrypt.com/Pages/Telephony/dme.html, May 2, 2000, 4 pages.

"CSD 3600," *Secure encrypted telephone and cellular solutions by TCC*, http://135.145.192.160/csd3600.htm, May 2, 2000, 3 pages.

"For your ears only: inexpensive telephone encryption arrives," *Leadership Defined*, wysiwig://one.41/http://www.comput . . . frames, May 9, 2000, 2 pages.

* cited by examiner

SCS Application Diagram

ENCRYPTION AND AUTHENTICATION METHODS AND APPARATUS FOR SECURING TELEPHONE COMMUNICATIONS

RELATED APPLICATIONS

This application claims priority from U. S. Provisional Patent Application Ser. No. 60/106,016, filed Oct. 28, 1998, the contents of which are hereby incorporated by reference. This application claims priority from U. S. Provisional Patent Application Ser. No. 60/122,682, filed Mar. 3, 1999, the contents of which are hereby incorporated by reference. The subject matter disclosed herein is related to the subject matter disclosed in copending application Ser. No. 09/428, 845 filed on even date herewith, entitled "Apparatus and methods for cryptographic synchronization in packet based communications."

FIELD OF THE INVENTION

The present invention relates generally to encryption devices. In particular, the invention relates to methods and apparatus for securing telephone communications by encrypting audio signals between the handset and base unit of a host telephone.

BACKGROUND OF THE INVENTION

Historically, non-governmental voice communications over telephone networks have rarely been secured with an encryption product. This is largely due to the high expense typically associated with such a product, and the administrative burden of managing encryption keys among the devices. Yet the value of the information conveyed over telephone networks is increasing steadily. Telephone security products would see widespread use if their costs were reduced to the point where the corporate, financial, legal, medical, and industrial communities could afford them, and if the administrative tasks associated with the set-up and control of these products was minimized.

Existing telephone security products typically connect between the telephone and the telephone network. This typically permitted their application only on public-switched telephone networks (PSTNs), however, since they frequently interfere with proprietary services offered over private branch exchange (PBX) based telephone networks. In addition, these products usually cannot be applied to networks where proprietary digital PBXs or Integrated Services Digital Network (ISDN) protocols are employed since these interfaces are not standardized.

Thus, there is a need in the art for a small, inexpensive encryption device that can be connected between the handset and base unit of any of a variety of ordinary telephones to provide secure, full-duplex telephone conversations that are immune from eavesdropping with no degradation in speech quality.

SUMMARY OF THE INVENTION

According to the present invention, an encryption device for a telephone having a handset and a base unit comprises a handset interface, a first converter, an encryption processor, a second converter, and a host interface. The handset interface receives analog output signals from the handset, and the first converter converts the analog output signals into digital output signals.

The encryption processor comprises a compressor, a key manager, an encryptor, and a modulator. The key manager generates key material for encrypting the digital output signals. The compressor compresses the digital output signals, the encryptor encrypts the digital output signals based on the key material, and the modulator modulates the encrypted digital output signals.

The second converter converts the encrypted digital output signals into encrypted analog output signals, and the host interface receives the encrypted analog output signals from the encryption processor, and forwards the encrypted analog output signals to the base unit.

The encryption device can also include a human-machine interface coupled to the encryption processor via which a user of the encryption device can communicate with the encryption processor.

According to one aspect of the invention, the encryption device can include a gain adjustment circuit coupled to the base unit interface that adjusts a signal level of the encrypted analog output signals. A user of the device can use the human-machine interface to enter a code that corresponds to the telephone to which the device is coupled. The gain adjustment circuit can then adjust the signal level of the encrypted analog output signals based on the received code.

According to another aspect of the invention, the encryption device can include a bypass control circuit that is coupled to the handset interface and to the base unit interface, via which the analog output signals can bypass the encryption processor. A user of the device can use the human-machine interface to cause the analog output signals to selectively bypass the encryption processor.

According to still another aspect of the invention, the encryption device can include a bias detect circuit coupled to the base unit interface, and a microphone bias circuit coupled to the bias detect circuit and to the handset interface. The bias detect circuit detects a bias voltage polarity provided by the base unit interface, and directs the microphone bias circuit to provide the bias voltage polarity to the handset.

According to another aspect of the invention, the encryption processor encrypts the output signals by generating a cryptographic session key, defining a state vector, encrypting the state vector to produce a keystream. The state vector is encrypted using the cryptographic session key and a cryptographic block transformation. Then, the keystream is combined with the output signals to produce encrypted output signals. The encryption processor can define the state vector, at least in part, by incrementing a value of the variable field.

According to still another aspect of the invention, the encryption device can include a processor having a memory for storing a set of security parameters. The processor transmits to a far-end telephone a message containing a representation of the set of security parameters. The processor then receives from the far-end telephone a message containing a selected security parameter selected from the set of security parameters. The encryption device then establishes a secure session with the far-end telephone based on the selected security parameter.

A decryption device according to the invention comprises a host interface, a first converter, a decryption processor, a second converter, and a handset interface. The host interface receives analog input signals from the base unit, and the first converter converts the analog input signals into digital input signals. The decryption processor comprises a demodulator that demodulates the digital input signals, a key manager that generates key material for decrypting the digital input signals, a decryptor that decrypts the digital input signals based on the key material, and a decompressor that decompresses the decrypted digital input signals. The second converter converts the decrypted digital input signals into decrypted analog input signals, and the handset interface receives the decrypted analog input signals from the decryption processor, and forwards the decrypted analog input signals to the handset.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and apparatus disclosed.

DETAILED DESCRIPTION OF THE PREFERRED EMBODIMENTS

Figure 1:
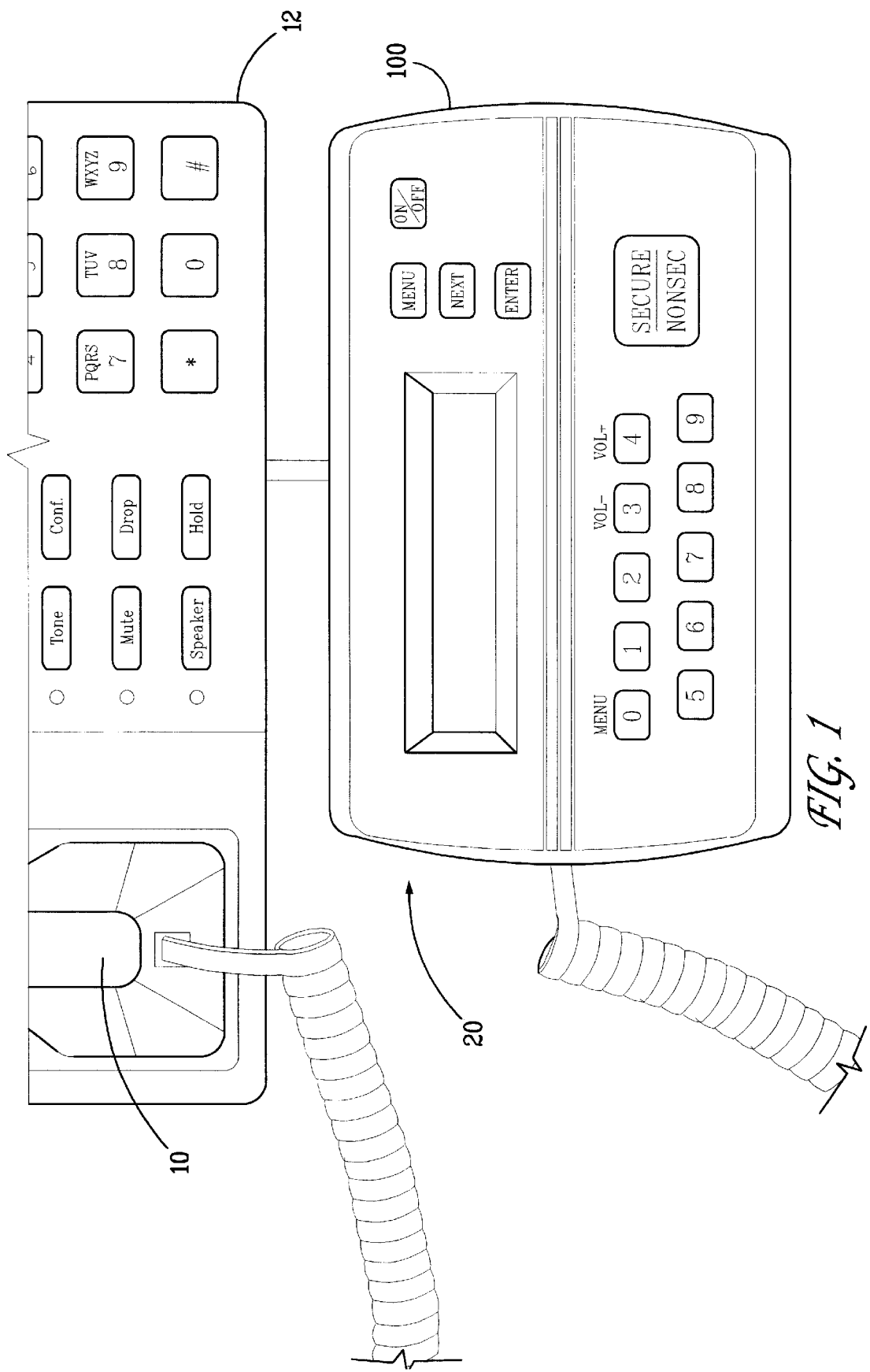
FIG. 1 shows a preferred embodiment of an encryption system according to the present invention.

As shown in FIG. 1, a Secure Communications System (SCS) 100 according to the present invention is a small device that can be connected between a handset 10 and base unit 12 of a host telephone 20. Host telephone 20 can be a digital or analog telephone, and can be connected to a public or private network. For example, a standard analog telephone (like those used in residential applications) would be connected to an analog telephone network. Proprietary digital phones, like the AT&T "DEFINITY" series telephones, typically connect to a private digital PBX. ISDN telephones typically provide a digital interface to a public network over ISDN service.

Regardless of the type of host telephone or network, SCS 100 receives analog output signals (i.e., audio, such as voice) from a microphone in handset 10, and then digitizes, compresses, and encrypts the output signals. The output signals are then converted back to analog tones. The analog tones are forwarded over the telephone network to which host telephone 20 is connected to a second host telephone comprising a second SCS (not shown in FIG. 1).

When received at the second SCS, the analog tones are demodulated and decrypted into compressed audio. The compressed audio is then expanded and converted back to an analog signal, which is driven out to the handset's earpiece. The identical process is also performed in the reverse direction within each SCS. The result is a full-duplex telephone conversation that is immune from eavesdropping with no degradation in speech quality.

Preferably, SCS 100 can be connected between the handset 10 and base unit 12 of a typical desktop telephone. Since SCS 100 does not connect to the telephone network directly, it can be used on any type of telephone network, whether it is digital or analog, or whether it is private or public. Additionally the full set of features provided by a PBX system (such as call forwarding, message waiting indications, etc.) remain available to the telephone to which SCS 100 is coupled. Thus, SCS 100 provides privacy and authentication for voice communications over digital and analog public and private telephone networks at an affordable price.

Figure 2:
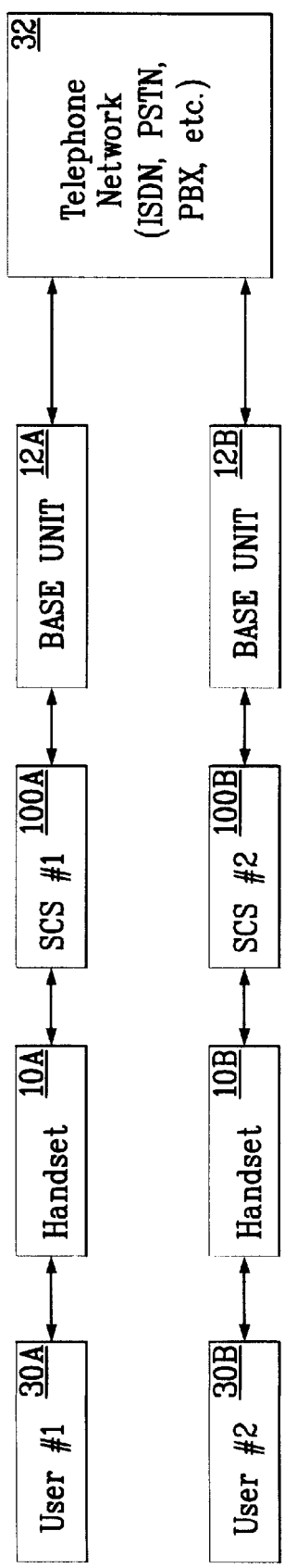
FIG. 2 is an application diagram for an encryption system according to the present invention.

FIG. 2 is an application diagram for an encryption system (or SCS) 100 according to the present invention. Referring to FIG. 2, a first user 30A uses a first telephone comprising a handset 10A, an SCS 100A, and a base unit 12A. Whenever user 30A speaks, for example, into handset 10A, SCS 100A receives an analog output signal from a microphone in handset 10A. As described above, SCS 100A digitizes the analog output signal, and compresses the resulting digital data into a bitstream. Preferably, the compression process is tailored to process speech in a near toll-quality manner. The bitstream is then encrypted, and cryptographic synchronization fields are appended to the resulting ciphertext (ciphertext is the bitstream resulting from the encryption of plaintext). The ciphertext is then converted back to an analog signal (e.g., analog tones) using an integral modulator.

SCS 100A delivers the analog tones to base unit 12A. Base unit 12A then forwards the analog tones over a telephone network 32 to a second base unit 12B of a remote host telephone operated by a second user 30B. Base unit 12B delivers the analog tones to a second (i.e., far-end) SCS 100B. When received at far-end SCS 100B, the analog tones are demodulated into ciphertext, and decrypted into compressed audio. The compressed audio is then expanded and converted back to an analog signal, which is driven out to an earpiece of handset 30B.

Figure 3:
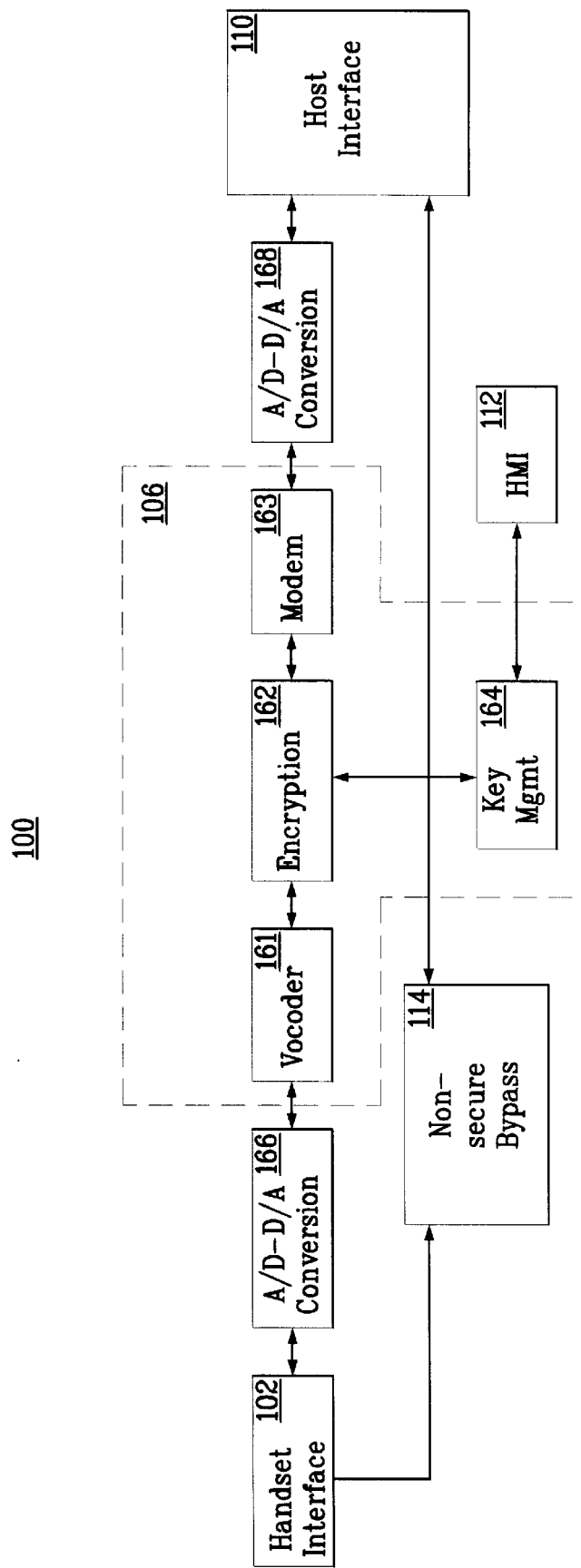
FIG. 3 is a functional block diagram of an encryption system according to the present invention.

FIG. 3 is a functional block diagram of a voice encryption system 100 according to the present invention. The functions performed by SCS 100 include a handset interface 102 so that analog signal levels can be adjusted appropriately, and to provide a proper polarity DC bias voltage to the handset microphone. This DC bias voltage is necessary for microphones to operate, in that this voltage is amplitude modulated by the audio signals presented to the microphone. In general, telephone handset interfaces are not standardized. A specific model of telephone might use either positive or negative microphone DC bias voltage.

To accommodate potential connection across a variety of telephones, SCS 100 automatically detects the DC bias voltage polarity provided by the host telephone and correspondingly adjusts the DC bias voltage polarity provided to handset 10. Preferably, this is accomplished through the use of an opto-coupler device, with its input diode connected across the two microphone leads from the host telephone. When the leads are positively biased, the opto-coupler's input diode conducts current, and its output transistors are activated. These output transistors control the state of a pair of solid-state switches, which in turn provide either a negative or positive DC bias voltage to handset 10. An opto-coupler is employed to provide DC voltage isolation between the host telephone and the SCS circuitry.

Following handset interface function 102, a first converter function 166 is employed to translate the analog signals used by handset 10 into a digital representation for processing. A vocoder function 161 translates the digitized audio into a compressed format where the bit rate is reduced to an appropriate rate for transmission by a modem. This rate is determined by the capabilities of the modulator when considering the quality of the telephone connection between SCS parties. When the anticipated telephone connection quality is high, the modulator is capable of higher bit-rate communications. When the telephone connection quality is low, the modulator can only provide low bit-rate communications.

An encryption function 162 performs synchronization and encryption/decryption of the compressed voice traffic. The encryption process begins with a state vector. This state vector has a fixed length (e.g., 64 bits), and contains fixed and variable fields of information. The variable fields are incremented in a counter mode such that each state vector value differs from all previous values for a given end-to-end connection. The state vector is then encrypted using a cryptographic block transformation (e.g., CAST-128, DES, Triple DES, etc.) and a cryptographic session key to produce an identically sized block containing a pseudo-random keystream. This pseudo-random keystream block is then modulo-2 added to blocks of the digitized voice. The result of this modulo-2 addition is called the ciphertext. The encryption process is described in greater detail in copending patent application Ser. No. 09/428,845, entitled "Methods and Apparatus for Cryptographic Synchronization in Packet Based Communications," which is hereby incorporated by reference.

A key management function 164 performs the processing necessary to derive a random, one-time session key for the encryption process, authenticates a potential user via a PIN, and verifies the authenticity of a far-end SCS during a secure call by using a cryptographic signature verification.

A modem function 163 translates the encrypted digital audio traffic into analog, audio-frequency tones suitable for transmission over telephone lines.

A second converter function 168 translates the digital samples produced by the modem into analog signals, after which they are delivered to host telephone base unit 12 through a host interface function 110. Host interface function 110 provides analog signal level adjustments and senses the polarity of the DC bias voltage supplied by the host telephone using the aforementioned opto-coupler circuit.

A nonsecure bypass function 114 provides a path for the analog audio information to circumvent the security functions when the user requests non-secure operation. HMI function 112 enables the user to control the operation of SCS 100, and to receive status information therefrom.

SCS 100 provides audio encryption services over public and private telephone networks, regardless of whether they are analog or digital networks. This audio encryption system operates over nearly all domestic telephone connections, and provides toll-quality audio transmission with real-time, end-to-end performance. Real-time performance is important since delays in processing a user's speech, for example, can lead to a perception by the user of a degradation of quality when the security is invoked.

SCS 100 provides an encryption system that ensures privacy by employing a high-quality encryption algorithm that employs traffic keys that are known only to the internal encryption functions. Preferably, the cryptographic algorithm that SCS 100 employs is the Triple DES 64-bit codebook. Triple-DES is a three-pass, 16-round, substitution-permutation network cryptosystem (a Fiestel Cipher) that has a block size of 64 bits, and uses up to a 168-bit key. Triple-DES uses standard arithmetical and logical operators along with an expansion permutation, an S-box substitution, and a P-box permutation per round. Other potential algorithms that SCS 100 can use include the Data Encryption Standard (DES), CAST-128, RC-5, and BLOWFISH.

The Triple-DES algorithm ensures that no third party is capable of eavesdropping on the conversation without doing an exhaustive search for the traffic key. The traffic key for the Triple-DES algorithm is developed by employing the Diffie-Hellman public-key algorithm to generate a random, unique, one-time, session encryption key between two communicating SCSs. This one-time session key is never exposed outside the SCS, and changes each time a secure call is made.

Additionally, SCS 100 employs an authentication function that displays to the user a unique key fingerprint for the session that prohibits a 'man-in-the-middle' attack by a potential eavesdropper. A man-in-the-middle attack is an attack where an adversary inserts himself between the two calling parties, and performs an independent key exchange with each party. Each party would assume that they are only connected to the intended recipient, but the man in the middle would be able to decrypt all of the traffic. SCS 100 thwarts this attack by hashing the result of the Diffie-Hellman public key exchange using the well-known Secure Hash Algorithm (SHA-1, per FIPS-180-1), and displaying a portion of the result to the user. To validate that there is no man in the middle, the users confirm that their SCS units are displaying the same key fingerprint. If there were a man in the middle, the two values would not match.

All unencrypted security parameters are stored and used within a single integrated circuit. This prevents an attacker who is monitoring signals between components within the SCS implementation from determining the secret session key used by the SCS for traffic encryption.

To enhance security, SCS 100 preferably employs PIN-based access control functions to ensure that only authorized operators use the SCS to secure their telephone conversations. Potential users who do not know the PIN cannot enable the SCS's security services.

In contradistinction to known prior art devices, an SCS according to the present invention provides a voice encryption system that performs all digital audio coding, encryption, modem, key management, and control functions in a single digital signal processor (DSP) 106. In a preferred embodiment, DSP 106 is a TMS320C549 device manufactured by Texas Instruments. This single-DSP approach allows the SCS to be physically smaller and more affordable than previous encryption products, and enhances security by limiting the presence of all critical security parameters to within a single integrated circuit.

Figure 4:
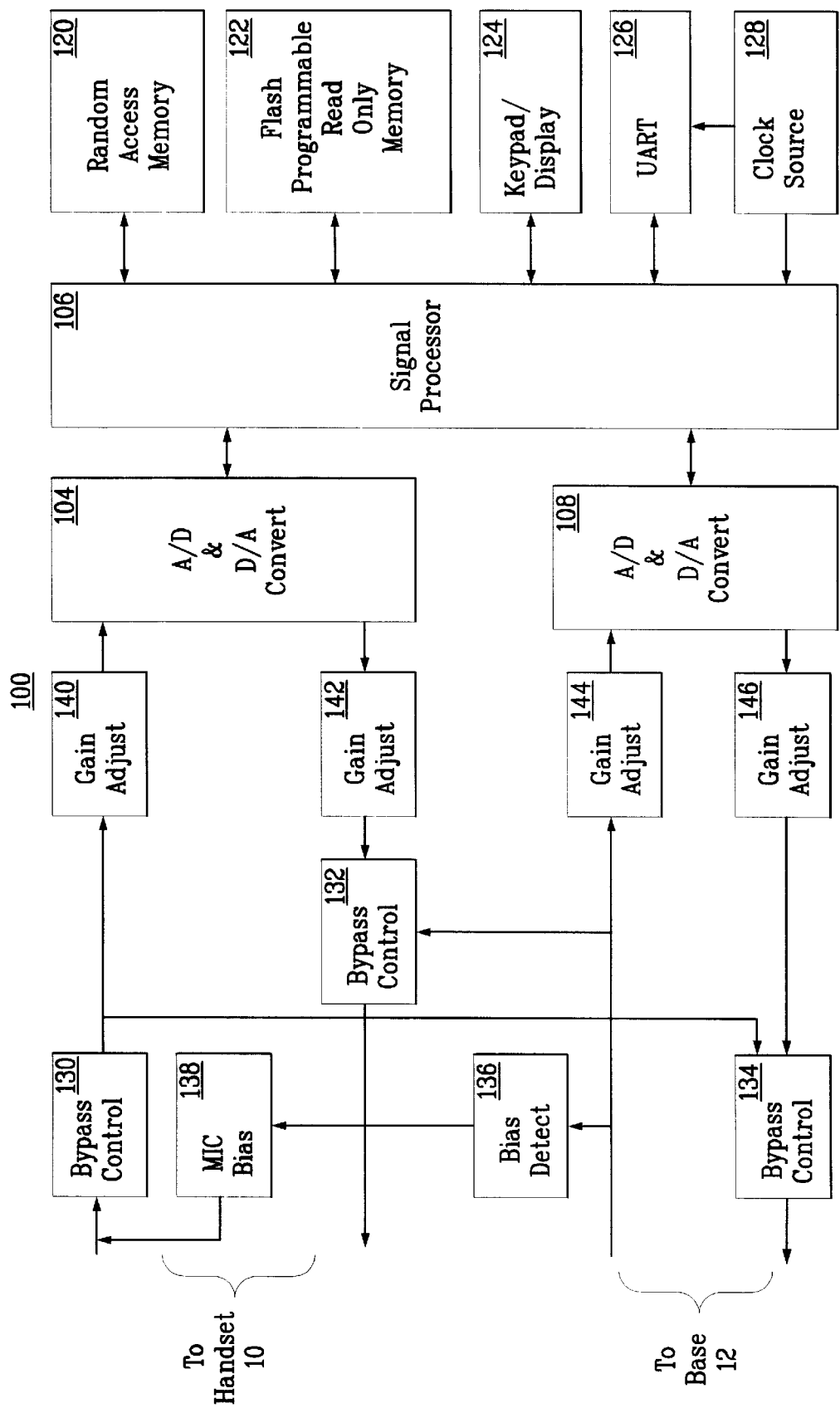
FIG. 4 is a block diagram of a preferred embodiment of an encryption system according to the present invention.

FIG. 4 is a block diagram of a preferred embodiment of a voice encryption system according to the present invention. Preferably, a keypad/display 124 is provided to allow the user to control SCS 100, to view the status of SCS 100, and to view the key fingerprint during a secure call. The preferred keypad (as shown in FIG. 1) can include: an ON/OFF key to control power; MENU, NEXT, and ENTER keys to manipulate and select menu options; numeric keys 0 through 9 for PIN entry; and a SECURE/NONSECURE key to activate and deactivate the security features. The preferred display is an alphanumeric display, providing two lines of 16 characters each. During the establishment of a secure call, the status of the call progression is displayed, and once the session is established, the mode of operation and the key fingerprint are displayed to the user.

Referring to FIG. 4, a bias detect circuit 136 using the aforementioned opto-coupler determines the polarity of the DC bias voltage provided by host telephone base unit 12. Bias detect circuit 136 automatically directs a microphone bias circuit 138 to provide the correct polarity bias voltage to the handset microphone. Preferably, microphone bias circuit 138 includes a pair of single-pole, double-throw, solid-state switches, where the switch common leads are connected to the microphone leads, and the switched leads alternately connected to a positive voltage bias resistor and a grounded bias resistor.

Input gain adjustment circuits 140, 144 implemented using operational amplifiers cascaded by a programmable attenuator, either amplify or attenuate the various analog signals such that their amplitude is sufficient to load A/D converters 104, 108 near their maximum input values.

Output gain adjustment circuits 142, 146 are preferably included within D/A converter circuits 104, 108. Output gain adjustment circuit 142 is adjusted to provide a comfortable volume in the handset's earpiece. Output gain adjustment circuit 146 provides a modem signal level to host telephone base unit 12 that is within FCC Part 68 limits (i.e., not greater than −9 dBm provided to the telephone network).

Preferably, a user can use the HMI to tailor SCS 100 for the particular telephone to which SCS 100 is coupled. For example, the user can cause SCS 100 to adjust the gains by entering, via keypad/display 124, a code that identifies to SCS 100 the type of telephone to which SCS 100 is coupled. In a preferred embodiment, a user is provided with a list of telephone types, each of which is associated with a four digit code. The user can then enter the four digit code associated with the telephone to which SCS 100 is coupled.

SCS 100 then parses the four digit code as follows. The first two digits represent the transmit gain, the third digit represents the receiver gain, and the fourth digit represents the microphone gain. SCS 100 then adjusts the gains based on the information in the user-entered code. It should be understood that this is but one method of adjusting the gain within an SCS. For example, SCS 100 could maintain an internal table of codes wherein each code corresponds to a particular telephone type. The code table can also include the gain adjustments that would be necessary for the telephone associated with the code. In this case, when the user enters a code via the keypad, the SCS looks up the code in the table, and automatically adjusts the gains accordingly.

Bypass control circuits 130, 132, 134 provide paths to bypass the security function of SCS 100, by connecting the analog signals directly between handset 10 and base unit 12. Preferably, bypass control circuits 130, 132, 134 use two other pairs of single-pole, double-throw, solid-state switches to select between connecting handset 10 directly to the base unit 12, or using the signals provided from D/A converters 104, 108. Preferably, a user can select secure or non-secure via the SECURE/NONSECURE key on keypad/display 124.

Converters 104, 108 convert signals between analog and digital representations. Digital signal representations are provided to digital signal processor (DSP) 106, where they are compressed (e.g., from 128 k bps to 8 k bps in a preferred embodiment), encrypted, and modulated/demodulated. DSP 106 also performs cryptographic key management functions, control functions, and manages the human-machine interface.

A universal asynchronous receiver-transmitter (UART) 126 is used to permit serial communications between SCS 100 and an external data device. These serial communications exchange initial cryptographic keying material, and provide a path to update the operational firmware of the SCS.

Clock Source 128 provides a square-wave reference clock to DSP 106 and UART 126 to control their operation. DSP 106 is supported by a random access memory (RAM) 120 to store temporary data, software, and parameters. DSP 106 is also supported by a programmable read only memory (PROM) 122, which stores software and non-volatile parameters. To thwart attempts at accessing secret information within SCS 100, when unencrypted security parameters (e.g., the random portion of the Diffie-Hellman exchange and the one-time session key) exist within the SCS, they are never stored outside of the DSPs internal memory. Whenever a secure session is terminated (either under user direction or via timeout), DSP 106 erases all unencrypted data and security parameters.

SCS 100 can also include the ability to automatically negotiate operational security parameters with a far-end SCS during the establishment of a secure session. Negotiation signaling between a local and a far-end SCS allows the SCSs to choose, for each secure session, the encryption algorithm to be used (e.g., DES, CAST, 3-DES, IDEA, SKIPJACK, etc.), and the coding algorithm to be used (e.g., G.723, G.729, CELP, LPC, etc.). The negotiation signaling also allows the SCSs to chose the public key modulus size (e.g., 512 bits, 1024 bits, 2048 bits, 4096 bits), the source of the modulus (e.g., the SKIP protocol, custom developed, etc.), and the length of the traffic key (e.g., 56 bits, 64 bit, 80 bits, 112 bits, 128 bits, 168 bits, etc).

Preferably, the negotiation process occurs automatically, and does not require user intervention. For example, negotiation can be accomplished by the initiating SCS (i.e. the SCS that started the secure session) transmitting to the far-end SCS a set of security mode words that represent the security parameters that the initiating SCS can support. Each security mode word has bit fields encoded within it that correspond to each of the security parameters described above. Values within each bit field correspond to specific selections for each parameter. The responding SCS selects from this set the highest integrity security mode (based on traffic key length and public key modulus length) that it can also support, and replies with this selection to the initiating SCS. Both SCSs then use the selected mode for the secure session. Preferably, if no compatible security mode exists between the two SCSs, a security session is not established.

The application of this capability becomes apparent when various versions of SCSs are produced. For example, a first SCS might include the capability to work with traffic keys only up to 64 bits in length. A second SCS might include the ability to communicate with both 64-bit traffic keys and 128-bit traffic keys. This allows the first SCS to communicate with a far-end SCS using a 128-bit key, as well as a far-end SCS using a 64-bit key. The second SCS, however, can only communicate with a far-end SCS using a 64-bit key. Thus, if the first SCS were to attempt to establish a secure session with the second SCS using the negotiation process described above, the SCSs would agree to use a 64-bit key for that secure session.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

We claim:

1. An encryption device for a telephone having a handset and a base unit, comprising:

a handset interface that receives analog output signals from the handset;

a first converter that converts the analog output signals into digital output signals;

a single digital signal processor comprising a compressor that compresses the digital output signals, a key manager that generates first key material for encrypting the digital output signals, an encryptor that encrypts the digital output signals based on the first key material, and a modulator that modulates the encrypted digital output signals;

a second converter that converts the encrypted digital output signals into encrypted analog output signals;

a host interface that receives the encrypted analog output signals from the second converter, and forwards the encrypted analog output signals to the base unit; and a gain adjustment circuit coupled to the host interface that automatically adjusts a signal level of the analog output signals to be compatible with the base unit.

2. The encryption device of claim 1, further comprising:

a human-machine interface coupled to the digital signal processor via which a user of the encryption device can communicate with the digital signal processor.

3. The encryption device of claim 2, wherein the digital signal processor receives from the human-machine interface a code that corresponds to the telephone, and wherein the gain adjustment circuit adjusts the signal level of the encrypted analog output signals based on the received code.

4. The encryption device of claim 1, further comprising:

a bypass control circuit that is coupled to the handset interface and to the host interface, via which the analog output signals can bypass the digital signal processor.

5. The encryption device of claim 4, further comprising a human-machine interface via which a user of the device can cause the analog output signals to selectively bypass the digital signal processor.

6. The encryption device of claim 1, further comprising:

a bias detect circuit coupled to the host interface; and a microphone bias circuit coupled to the bias detect circuit and to the handset interface, wherein the bias detect circuit detects a bias voltage polarity provided by the host interface, and directs the microphone bias circuit to provide the bias voltage polarity to the handset.

7. The encryption device of claim 1, wherein the host interface receives analog input signals from the base unit;

the second converter converts the analog input signals into digital input signals;

the key manager generates second key material for decrypting the digital input signals;

the digital signal processor comprises a demodulator that demodulates the digital input signals, a decryptor that decrypts the digital input signals based on the second key material, and a decompressor that decompresses the decrypted digital input signals;

the first converter converts the decrypted digital input signals into decrypted analog input signals; and the handset interface receives the decrypted analog input signals from the first converter, and forwards the decrypted analog input signals to the handset.

8. The encryption device of claim 7, further comprising:

a second gain adjustment circuit coupled to the handset interface that adjusts a signal level of the decrypted analog input signals.

9. A decryption device for a telephone having a handset and a base unit, comprising:

a host interface that receives analog input signals from the base unit;

a first converter that converts the analog input signals into digital input signals;

a decryption processor comprising a demodulator that demodulates the digital input signals, a key manager that generates key material for decrypting the digital input signals, a decryptor that decrypts the digital input signals based on the key material, and a decompressor that decompresses the decrypted digital input signals;

a second converter that converts the decrypted digital input signals into decrypted analog input signals;

a handset interface that receives the decrypted analog input signals from the second converter, and forwards the decrypted analog input signals to the handset; and a gain adjustment circuit coupled to the host interface that automatically adjusts a signal level of the analog input signals to be compatible with the base unit.

10. The decryption device of claim 9, further comprising:

a human-machine interface coupled to the decryption processor via which a user of the decryption device can communicate with the decryption processor.

11. The decryption device of claim 9, wherein the gain adjustment circuit automatically adjusts the signal level of the analog input signals to compensate for a gain or loss of the base unit.

12. The decryption device of claim 10, wherein the decryption processor receives from the human-machine interface a code that corresponds to the telephone, and wherein the gain adjustment circuit adjusts the signal level of the analog input signals based on the received code.

13. The decryption device of claim 9, further comprising:

a bypass control circuit that is coupled to the handset interface and to the host interface, via which the analog input signals can bypass the decryption processor.

14. The decryption device of claim 13, further comprising a human-machine interface via which a user of the device can cause the analog input signals to selectively bypass the decryption processor.

15. The decryption device of claim 9, further comprising:

a bias detect circuit coupled to the host interface; and a microphone bias circuit coupled to the bias detect circuit and to the handset interface, wherein the bias detect circuit detects a bias voltage polarity provided by the host interface, and directs the microphone bias circuit to provide the bias voltage polarity to the handset.

* * * * *